United States Patent
Settineri et al.

[15] 3,681,419
[45] Aug. 1, 1972

[54] PROCESS FOR PRODUCING BISORGANOMERCURY COMPOUNDS

[72] Inventors: William J. Settineri; Ritchie A. Wessling, both of Midland, Mich.

[73] Assignee: The Dow Chemical Company, Midland, Mich.

[22] Filed: April 13, 1970

[21] Appl. No.: 28,126

[52] U.S. Cl..................................260/433
[51] Int. Cl....................................C07f 3/12
[58] Field of Search.....................260/433, 431

[56] References Cited

UNITED STATES PATENTS 2,909,543  10/1959  Weesner........................260/433
3,534,078  10/1970  Woodhall et al..........260/433 X

OTHER PUBLICATIONS

Chemical Abstracts, Vol. 65 pg. 20,159f (1966)
Nesmeyanov et al., The Organic Compounds of Mercury, North–Holland Publ. Co. Amsterdam, Vol. 4, pp. 27, 32 and 45 to 56 (1967) (QD–412.H6M3)

*Primary Examiner*—Tobias E. Levow
*Assistant Examiner*—H. M. S. Sneed
*Attorney*—Griswold & Burdick and C. E. Rehberg

[57] ABSTRACT

Bisorganomercury compounds having the formula

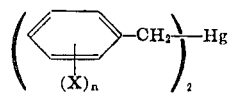

wherein $n$ is an integer of from 0 to 5 and X is an inert, substantially non-interfering substituent, are prepared by contacting an alkali metal amalgam with a sulfonium salt of the formula

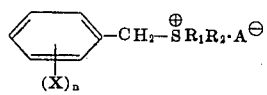

wherein X and $n$ are as defined above, $R_1$ and $R_2$ are alkyl groups or $R_1$ joins with $R_2$ to form a cycloaliphatic group, or the corresponding hydroxy-substituted alkyl or cycloaliphatic groups, and $A^\ominus$ is an anion. The reaction is preferably conducted in an aqueous solution. The bisorganomercury compounds are useful as catalysts for free-radical-initiated polymerizations and as fungicides, insecticides, and the like.

10 Claims, No Drawings

PROCESS FOR PRODUCING BISORGANOMERCURY COMPOUNDS

SUMMARY OF THE INVENTION

It has now been discovered that bisorganomercury compounds having the formula (I) 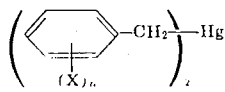

wherein $n$ is an integer of from 0 to 5 (preferably 0 to 3) and X is an inert, substantially non-interfering substituent, are prepared in a novel process comprising reacting by contacting an alkali metal amalgam with a sulfonium salt of the formula (II) 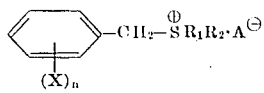

In II, $n$ and X have the above meaning; $R_1$ and $R_2$ are (1) alkyl groups of from one to about 25 carbon atoms (preferably, from one to about four carbon atoms) or (2) $R_1$ is joined with $R_2$ to form an alkylene group of from two to about seven carbon atoms (preferably, four or five carbon atoms) or (3) a hydroxy-substituted such alkyl or alkylene groups; and A° is an anion. The reaction consumes the amalgam to form (I) and a sodium salt. The products are known to be useful as polymerization catalysts and as fungicides, insecticides, and the like.

Suitable sulfonium salts in the subject process are represented by (II) above. In (II), X represents an insert, substantially noninterfering substituent, such as a hydrocarbyl or hydrocarbyloxy group of from 1 to about 25 carbon atoms or halogen. Examples of suitable such substituents include: alkyl, such as methyl, ethyl, octyl, decyl, octadecyl, and the like; aryl, such as phenyl, naphthyl, and the like; alkenyl, such as vinyl, allyl, 3-butenyl, and the like; alkaryl, such as tolyl, 3,5-dimethylphenyl, 4-t-butylphenyl, and the like; aralkyl, such as benzyl, phenethyl, 2-phenylpropyl, 4-phenylbutyl, and the like; alkoxy, such as methoxy, propoxy, butoxy and the like; aryloxy, such as phenoxy, and the like; alkenyloxy, such as allyloxy, 3-butenyloxy, and the like, and halogen, such as fluoro, chloro and bromo. Preferred sulfonium salts are those wherein (a) $R_1$ and $R_2$ are alkyl or hydroxyalkyl of from one to about four carbon atoms (the preference being based on the volatility of the $R_1$—S—$R_2$ by-product), or (b) $n$ is 0 or 1 and X is alkyl of from about five to about 20 carbon atoms or alkenyl of from two to about four carbon atoms. The most preferred sulfonium salts are represented by a combination of (a) and (b). A° in (II) is suitably the anion of an organic or inorganic acid, such as benzoate, tosylate, halide, nitrate, bisulfate, etc., or other such anions. The choice of anion is not critical but is advantageously selected so as to increase the solubility of the sulfonium salt, e.g., the halides are advantageous when the solvent is water and the tosylate is advantageous when the solvent is an organic solvent. Representative examples of suitable sulfonium salts include
benzyldimethylsulfonium chloride or bromide,
benzyldiethylsulfonium chloride or bromide,
benzyldi-n-butylsulfonium bisulfate, or nitrate
benzyldi(2-hydroxyethyl)sulfonium chloride,
benzyldidecylsulfonium fluoride or chloride,
benzyldi-n-octadecylsulfonium chloride or iodide,
4-chlorobenzyldipropylsulfonium chloride,
4-fluorobenzyldimethylsulfonium chloride, or nitrate
4-fluorobenzylmethyl-n-butylsulfonium chloride or nitrate
2,4-dichloro- and 2,4-dibromobenzyldiethylsulfonium bromide,
4-methyl and 2,4-dimethylbenzyldimethylsulfonium fluoride or chloride,
4-t-butylbenzyldiethylsulfonium bisulfate,
4-butoxybenzyldi-n-butylsulfonium fluoride or chloride,
4-decyl-, 4-dodecyl- and 4-octadecylbenzyldi(2-hydroxyethyl) sulfonium chloride,
4-octylbenzyldi-n-decylsulfonium tosylate,
4-(2-hydroxypropyl)benzyldimethylsulfonium fluoride or bromide,
p-phenyl- and p-phenoxybenzyldiethylsulfonium chloride or bromide.
m-(p-tolyl)benzyldimethylsulfonium bromide,
p-(phenethyl)benzyldipropylsulfonium fluoride, bromide or chloride,

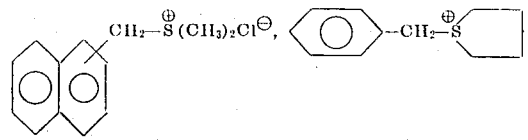

chloride, bromide or tosylate,

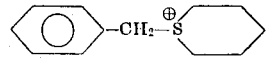

chloride or tosylate, and other like compounds.

The above and other suitable benzylsulfonium salts may be prepared by any known convenient methods, as for example, by reacting a benzyl halide with a dialkyl sulfide, a bis(hydroxyalkyl) sulfide or a thiacycloalkane is an aqueous medium.

Suitable alkali metal amalgams include lithium, sodium or potassium amalgams, or mixtures thereof. Sodium amalgams are preferred.

The amalgams suitable for use in this invention are liquids. Thus, they contain a minimum of (a) 100 moles of mercury/mole of lithium, (b) 27.5 moles of mercury/mole of sodium, and (c) 50 moles of mercury/mole of potassium and may contain (as a practical upper limit) as much as about 10,000 moles of mercury/mole of alkali metal. Preferred amalgams are those having (a) from about 0.001 to about 0.1 weight percent lithium, (b) from about 0.001 to about 0.05 weight percent sodium, and (c) from about 0.001 to about 0.01 weight percent potassium. Solid amalgams are operable in the sense that reduction of the sulfonium salt occurs, but the major product is a toluene-type compound, i.e., the sulfonium group is replaced with a hydrogen atom (e.g., $C_6H_5$—$\overset{\oplus}{S}(CH_3)_2Cl^{\ominus}$ → $C_6H_5CH_3$).

The process is preferably conducted in the presence of a suitable solvent i.e., a solvent which dissolves the sulfonium salt but is irreducible in the process or is not preferentially reduced. Suitable such solvents include water and relatively polar organic compounds, such as tetrahydrofuran, dimethylformamide, dimethylsulfoxide, hexamethylphosphoramide, dioxane, the lower alkanols, such as methanol, ethanol, isopropanol and the like, and mixtures of the above solvents, mixtures of the above solvents in water, and the like. Water is the preferred solvent. A mixture of water and an organic solvent (like toluene, which can solvate the product) is likewise operable and may be advantageous at higher concentrations of alkali metal in mercury.

The concentration of the sulfonium salt in solution may vary from about $10^{-3}$ moles/liter to saturation, with a concentration of from about $10^{-2}$ to about 2 moles/liter being preferred.

The reaction rate increases in proportion to temperature, time and surface area and concentration of alkali metal in the amalgam.

Suitable reaction temperatures vary from about 15° C. up to about 100° C., but are preferably from about 25° C. to about 50° C.

Suitable reaction times vary from a few minutes to a few hours, e.g., from 5 minutes to about 48 hours.

To increase the surface area, the amalgam is preferably stirred or otherwise agitated. Mechanical blenders, such as stirring bars, shakers and particularly shear blenders are advantageous.

The reaction may be conducted as a batch or continuous process.

SPECIFIC EMBODIMENTS

The following examples further illustrate the invention.

In the following examples, a solution (20 ml. unless stated otherwise) of the sulfonium salt at room temperature was poured over a stirred sodium amalgam (20 ml. unless stated otherwise) and stirred for varying amounts of time. The products were identified by at least one of the following analytical procedures: infrared spectroscopy, nuclear magnetic resonance and mass spectroscopy.

EXAMPLES 1-4

A solution containing benzyldimethylsulfonium tosylate was reduced to form dibenzylmercury as follows:

TABLE I

| Ex. No. | Amalgam Concentration (Wt. % Na) | Sulfonium Salt, Moles | Solvent | Time, Hours | Product Yield, Percent |
|---|---|---|---|---|---|
| 1 | 0.001 | $3.08 \times 10^{-3}$ | $H_2O$ | 8.0 | 80 |
| 2 | 0.002 | $1.63 \times 10^{-3}$ | $H_2O$ | 0.25 | 14 |
| 3 | 0.01 | $1.38 \times 10^{-1}$ | $H_2O$ | 8.0 | toluene formed |
| 4 | 0.01 | $1.92 \times 10^{-1}$ | DMF | 8.0 | 25 |

In Example 2, 200 ml. of amalgam and 100 ml. of sulfonium solution were used.

EXAMPLE 5

In like manner to Example 1, p-chlorobenzyldimethylsulfonium chloride was reduced to give bis(p-chlorobenzyl)mercury.

Example 6

In like manner to Example 1, p-methylbenzyldimethylmercury chloride was reduced to form bis(p-methylbenzyl)mercury.

Similarly, the other dibenzylmercury compounds defined above can be prepared by using the appropriate sulfonium salt in the reaction.

We claim:

1. A method of preparing compounds of the formula

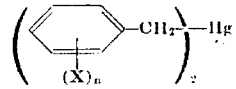

wherein $n$ is an integer from 0 to 5 and X is an inert, substantially non-interfering hydrocarbyl or hydrocarbyloxy group of from one to 25 carbon atoms or halo, said process comprising reacting by contacting, at a reaction temperature of from about 15° C. to about 100° C., a liquid alkali metal amalgam and a solution of a benzylsulfonium salt having the formula

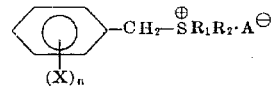

wherein $n$ and X are as defined above, $R_1$ and $R_2$ are (1) alkyl groups of from one to 25 carbon atoms, or (2) $R_1$ is joined with $R_2$ to form an alkylene group of from two to seven carbon atoms, or (3) a hydroxy-substituted such alkyl or alkylene group and A is an anion.

2. The method defined in claim 1 wherein $n$ is an integer from 0 to 3.

3. The method defined in claim 1 wherein $n$ is 0 or 1 and X is alkyl of from five to 20 carbon atoms or alkenyl of from two to four carbon atoms.

4. The method defined in claim 3 wherein $n$ is 0.

5. The method defined in claim 1 wherein the reaction is conducted in aqueous solvent.

6. The method defined in claim 1 wherein the reaction temperature is from about 25° C. to about 50° C.

7. The method defined in claim 1 wherein said amalgam has from about 0.001 to about 0.05 weight percent sodium.

8. The method defined in claim 1 wherein $R_1$ and $R_2$ are alkyl or hydroxy-alkyl groups of from one to four carbon atoms.

9. The method defined in claim 8 wherein $n$ is 0 or 1 and X is an alkyl group of from five to 20 carbon atoms or alkenyl of from two to four carbon atoms.

10. The method defined in claim 1 wherein A is fluoride, chloride, bromide, iodide, nitrate, bisulfate, tosylate or benzoate.

* * * * *